Patented June 13, 1950

2,511,453

UNITED STATES PATENT OFFICE 2,511,453

CATALYST AND PROCESS FOR CARRYING OUT HYDROGENATION REACTIONS

Arthur W. Barry, Charleston, W. Va., assignor to E. I. du Pont de Nemours & Company, Wilmington, Del., a corporation of Delaware No Drawing. Application August 13, 1947, Serial No. 768,495

11 Claims. (Cl. 260—677)

This invention relates to improved hydrogenation catalysts and to processes for employing these catalysts in selective hydrogenation reactions. In a particular embodiment, the invention relates to the use of these catalysts for the selective hydrogenation of acetylenic compounds in the presence of lower olefins.

Selective hydrogenation reactions are of two types, namely those involving simultaneous treatment of two or more unsaturated organic compounds in such a way as to hydrogenate at least one but not all of the compounds; and those involving treatment of an organic compound which contains several unsaturated groupings in such a way as to hydrogenate at least one but not all of these groupings. There has been much effort within the chemical industry to develop efficient processes for carrying out these selective hydrogenation reactions.

One process which illustrates many of the problems common to the selective hydrogenation field is the process for catalytically hydrogenating gas mixtures containing both acetylenic and olefinic compounds. This process is important because the lower olefins are readily available from the gaseous products of various hydrocarbon cracking operations, and selective hydrogenation represents one of the most attractive methods for removing the acetylenic impurities usually present in these gases in order to prepare lower olefins of suitable purity for a number of subsequent uses. In carrying out this selective hydrogenation process according to the methods of the prior art, considerable difficulties are encountered. If it is desired to remove all but a trace of the acetylene originally present, a comparatively active catalyst must be used, with the result that the olefin content of the gas is appreciably reduced. If, in order to avoid this loss of olefin, a less active catalyst is employed, then a high degree of acetylene removal cannot be achieved. In addition the catalysts known heretofore tend to promote the formation of polymers from the unsaturated compounds and these polymers, by collecting on the catalyst, diminish its activity. Catalyst poisons, moreover, make it difficult to control and maintain the activity of the catalysts. In general, the more completely it is desired to remove the acetylenic compounds, the more imposing these difficulties become. Efforts to overcome them, as by controlling the water vapor content of the gases or by modifying the catalysts, have not been entirely satisfactory. The result, therefore, has been that it has not been commercially feasible to employ a hydrogenation process when it was desired to reduce the concentration of acetylenic compounds in these olefinic gases below about 0.2%.

It is an object of this invention to provide new hydrogenation catalysts. It is another object of the invention to provide catalysts which are particularly effective in carrying out selective hydrogenation reactions. It is a further object of the invention to provide catalysts which exhibit a high degree of selectivity for the hydrogenation of acetylenic compounds in the presence of lower olefins. Further objects of the invention are to provide selective hydrogenation catalysts which maintain the desired degree of activity over a long period of time, and to provide processes for preparing and regenerating these catalysts. A still further object of the invention is to provide a new process for the selective catalytic hydrogenation of acetylenic compounds in the presence of lower olefins. Another object is to provide a method for controlling selective hydrogenation reactions. Other objects of the invention will appear hereinafter.

According to this invention, it has been discovered that catalysts comprising partially-sulfided, reduced nickel oxide are highly effective in carrying out selective hydrogenation reactions. The expression "partially-sulfided" is employed herein to designate catalysts containing from about 2 to about 50 atom equivalents of sulfur per 100 atom equivalents of nickel, these catalysts being of the class consisting of those prepared by treating a composition containing reduced nickel oxide with a sulfiding agent, and those prepared by coprecipitating nickel sulfide with a nickel salt which is convertible to nickel oxide, converting the said salt to the oxide and thereafter reducing with a hydrogen-containing gas. The expression "reduced nickel oxide" refers to the reduction product obtained by treating a mixture containing nickel oxide at a temperature of about 200° to 600° C. or preferably at a temperature of about 450° to 500° C., with a gas containing hydrogen as the principal reducing agent. Particularly useful catalysts, according to this invention, are those which, in addition to the partially-sulfided reduced nickel oxide, also contain an oxide of one or more of the elements aluminum, chromium, and magnesium. The concentration of these latter oxides in the catalysts may vary from 0 up to about 96% of the total weight of the catalyst. The preferred sulfur content for all these catalysts is from about 3 to about 15 atom equivalents of sulfur per 100 atom equivalents of nickel. Methods for preparing and regenerating these catalysts are set forth hereinafter.

These catalysts may be employed advantageously in a number of selective hydrogenation reactions, of which the selective hydrogenation of acetylene in the presence of lower olefins is a good illustration. This process may be carried out by passing over the catalysts of this invention a gas comprising acetylene, hydrogen, a lower olefin, and, if desired, various amounts of inert diluents such as nitrogen, the saturated lower hydrocarbons, and the like. Hydrogen must be present in the gas in a proportion of at least one mol per mol of acetylene and is preferably present in amounts considerably in excess of this requirement. In many instances, the initial acetylene concentration of the gas will be fairly low, perhaps 5% or less. The hydrogenation process is best carried out at temperatures in the range of 125° to 350° C and at pressures of about atmospheric to about 50 lbs./sq. in. gauge or higher. The gas may be passed over the catalysts at any suitable space velocity, rates from about 500 up to about 8000 cubic feet of dry gas (standard conditions) per cubic foot of catalyst per hour having been employed satisfactorily.

The partially-sulfided catalysts of this invention may be prepared by co-precipitation, for instance, of basic nickel carbonate and nickel sulfide in the proper proportions, followed by drying, calcining at about 400° C., mixing with a pelleting lubricant, pelleting, sintering at 600° to 750° C. in an inert atmosphere and finally reducing with hydrogen at 400° to 450° C. Alternatively, the catalysts may be prepared by treating a composition containing reduced nickel oxide with a sulfiding agent such as hydrogen sulfide. In the latter instance, the reduced nickel oxide may advantageously be in the form of hard pellets which have previously been subjected to a sintering operation. The sulfiding may be carried out by passing a gas containing hydrogen sulfide over the reduced nickel oxide pellets at moderate temperatures. The optimum degree of sulfiding depends upon the other conditions chosen for carrying out the selective hydrogenation process, being higher as the hydrogenation temperature and pressure are raised.

Details of the methods for preparing and using the catalysts of this invention are illustrated by the following examples.

*Example 1.*—A partially-sulfided nickel catalyst is prepared by dissolving metallic nickel in nitric acid and treating the solution at 85° C. with ammonia and carbon dioxide to precipitate nickel carbonate. The carbonate is then filtered, dried and ignited at 400° C. to decompose the carbonate to oxide. After being kneaded with water, the cake is dried at 150° C., granulated through a 10-mesh screen, mixed with 1 to 3% Dritex (a powdered vegetable stearin marketed by the Capital City Products Company, Columbus, Ohio) or similar material and formed into cylindrical pills ¼" in height and ¼" in diameter. The pills are sintered by heating to 900° C. for 3 hours and are then reduced at atmospheric pressure using hydrogen at 450° to 500° C. The nickel is then partially sulfided by circulating a stream of hydrogen sulfide over the catalyst at room temperature until the sulfur content of the resulting catalyst is between about 2 and about 50 atom equivalents of sulfur per 100 atom equivalents of nickel.

*Example 2.*—A partially-sulfided nickel-alumina catalyst, containing nickel and aluminum in the proportions 75% NiO to 25% Al$_2$O$_3$ prior to reduction, is prepared by adding 215 parts of powdered alumina hydrate to a solution of nickel nitrate containing 420 parts of nickel. The slurry is warmed to 85° C. and the nickel is precipitated by adding slowly 750 parts of solid ammonium carbonate. After agitating for 2 hours at about 85° C., the precipitate is filtered, washed, and dried for 24 hours at 150° C. It is then ignited for 3 hours at 400° C., cooled, and kneaded with only enough water to produce a hard, dry cake. The kneaded paste is dried for 24 hours at 150° C., granulated to pass through a 10-mesh screen, mixed with 3% "Dritex" (a vegetable stearin composition) and formed into ⅜" pills. These pills are sintered in a muffle furnace for 3 hours at 1060° to 1100° C. The reduction step is carried out by initially passing a gas containing 2 to 5% hydrogen and an inert diluent such as nitrogen over the catalyst pills at about 100° C. The hydrogen concentration of the gas is raised fairly rapidly to 100% and the temperature is raised to 450° to 500° C. under which conditions reduction is complete after about 24 hours. The reduction is considered to be complete when, at these temperatures, an initially dry hydrogen gas is passed over the catalyst and thereafter gives a negative test for water. The sulfiding step is carried out by circulating a gas containing 25 to 50% hydrogen sulfide and an inert diluent through a bed of the reduced catalyst at atmospheric pressure and at moderate temperature until about 8% of the nickel in the catalyst has been sulfided. The resulting catalyst pills are very strong and exhibit high resistance to crumbling.

*Example 3.*—A partially-sulfided nickel-chromium oxide catalyst is prepared by a process analogous to that of Example 2 with the exception that there is substituted for the alumina an amount of chromium oxide such that the catalyst, after reduction, analyzes 5% Ni and 95% Cr$_2$O$_3$. The resulting catalyst pills, after sulfiding, exhibit high mechanical strength.

*Example 4.*—A partially-sulfided nickel-barium carbonate catalyst, which, prior to reduction, analyzes 95% NiO and 5% BaCO$_3$, is prepared by adding the proper proportion of barium nitrate to the nickel nitrate solution, precipitating the nickel and barium together as the carbonates and continuing according to the process described in Example 1.

*Example 5.*—A catalyst is prepared by co-precipitating nickel sulfide with basic nickel carbonate in concentrations such that 20% of the nickel in the catalyst is in the form of the sulfide. After precipitation, the precipitate is filtered, dried, and ignited at 400° C. to decompose the carbonate. The mixture of nickel sulfide and oxide is kneaded, dried, granulated, mixed with 1 to 3% Dritex, pelleted and finally sintered in an inert atmosphere at 700° C. Reduction is effected as described in Example 2 but no sulfiding is required after reduction.

*Example 6.*—A gas containing, on a dry basis, 1% acetylene, 26.7% ethylene, 11.4% propylene, 12.2% hydrogen, the remainder being made up of methane, ethane and propane, and containing about 2% water vapor, is passed over a partially-sulfided nickel catalyst prepared according to the procedure described in Example 1. The gas is passed over the catalyst at a space velocity of about 1000 cubic feet of dry gas (S. T. P.) per cubic foot of catalyst per hour, the temperature and pressure being maintained at 200° C. and 20 to 30 lbs./sq. inch gauge respectively. Upon analysis of the exit gas it is found that the acetylene concentration has been reduced to 0.01%, while the ethylene concentration is 26.3%.

*Example 7.*—A gas containing 2% acetylene, 30% ethylene, 25% hydrogen, and 43% methane, nitrogen and other diluent gases is passed over a partially-sulfided nickel-alumina catalyst, prepared according to the method of Example 2. The space velocity is varied between 1000 and 3000, the temperature and pressure at the outset of the run being 150° C. and 20 lbs./sq. in. gauge. During the course of the run, the temperature and pressure are gradually raised in stepwise fashion so that at the end of 1000 hours, the temperature is 300° C. and the pressure is 40 lbs. sq./in. gauge. The acetylene removal throughout the whole run averages better than 99%. Analysis of the exit gas:—ethylene—29.8%, acetylene—0.009%.

*Example 8.*—A gas of the same composition as that employed in Example 7 is passed over the catalyst prepared according to Example 5. At atmospheric pressure, at a temperature of 185° C., and a space velocity of 1000, less than 3% of the inlet ethylene is hydrogenated while acetylene clean-up is better than 99%.

*Example 9.*—A partially-sulfided nickel-alumina catalyst which has been in use for a period of about 3 weeks and which has lost some of its original activity is regenerated in place by controlled oxidation with air at 500° C. The air is diluted with nitrogen because the heat of formation of nickel oxide is high and it is desirable to avoid excessive temperatures during the regeneration. At 500° C. any organic material on the catalyst is completely burned off. After the oxidation step, the catalyst is reduced with hydrogen at 450° to 500° C. as in Examples 1 or 2. No further sulfiding treatment is required before putting the catalyst on stream again. This regenerated catalyst exhibits substantially the same degree of activity and selectivity as catalysts freshly prepared according to the method of Example 2.

In general, the novel catalysts of this invention may be described as catalysts comprising reduced nickel oxide and sulfur. The expression "reduced nickel oxide" is employed because it is not known whether the nickel exists in the form of the metal or to some extent in the form of a lower oxide thereof. The sulfur content of the catalysts, upon analysis, is such that, if all the sulfur were present as the compound NiS, then between about 2% and about 50% of the nickel in the catalyst would exist as NiS. Again it should be pointed out that the form in which the sulfur exists or is combined within the catalysts is not definitely known and the formula NiS is used solely as a convenient method for expressing the ratio of sulfur to nickel. As illustrated by the above examples, nickel, whether as the metal or in a combined form, may be the sole constituent of the catalyst other than the non-metallic elements, sulfur and oxygen. Alternately, a great variety of other elements may be included such as aluminum, chrominum, magnesium, manganese, silicon, copper, silver, gold, uranium, vanadium, titanium, thallium, zirconium, zinc, tin, lead, bismuth, mercury, cobalt, iron, alkali metals, alkaline earth metals, rare earth metals and metals of the platinum group. These latter elements may be included either in their metallic form or in the form of various compounds, notably the oxides. Several of them may be included in one catalyst. For instance a catalyst which combines outstanding properties of strength, apparent density and activity may be prepared by partially sulfiding the reduction product of a composition containing NiO, $Al_2O_3$ and MgO in the weight ratio of about 60:30:10.

It should be understood that the catalysts of this invention may be employed in forms other than that of pills, this particular form having been described in the examples merely because pilled catalysts are especially attractive for large scale commercial operations. For instance, the catalysts may be deposited on any of the carriers known in the art such as the various carbons, clays, gels and the like, or, as an alternative, they may be prepared in a finely divided form for use in a fluid catalyst process. If pills are to be used, they may be fabricated in any desired form, such as cubes, spheres, cylinders, rings and the like, the dimensions of which will be dependent upon the design of the apparatus in which they are to be employed. Particularly preferred catalyst pills are those prepared by the process of pending application S. N. 633,851 of Alvin B. Stiles, which discloses the use of vegetable stearin as a highly effective lubricant and pelleting agent. A variety of other lubricants, including graphite, may be used in manufacturing the pills. It is noteworthy that the strength of these catalyst pills may be greatly increased by a sintering operation and that the apparent density of the pills may be controlled by controlling the temperature and length of time of sintering. The optimum sintering temperature may be dictated to some extent by the composition of the catalyst, being higher, for instance, for nickel-alumina catalysts than for plain nickel catalysts.

The step of sulfiding the preformed nickel catalysts may be carried out using a variety of liquid or gaseous sulfiding agents. A solution of elemental sulfur in a solvent such as benzene or toluene, or a sodium polysulfide solution, or carbon disulfide, either as a liquid or as a vapor or in solution, may be employed satisfactorily. Gases containing hydrogen sulfide or the lower alkyl mercaptans are also very effective. It will be noted that none of these sulfiding agents contain combined oxygen. The sulfiding may be done at room temperature, or, if desired, at any temperature from about 0° to about 150° C. Any suitable pressure may be employed. When using hydrogen sulfide as the sulfiding agent, the concentration of $H_2S$ in the gas is not very critical, although for practical reasons it is usually kept within the range of 25 to 50%, the remainder consisting of inert gases. In passing the hydrogen sulfide gas through the catalyst bed, a high leakage of hydrogen sulfide per pass and a low temperature are desirable to insure a uniform degree of sulfiding throughout the catalyst. The extent to which the catalyst should be sulfided depends entirely upon the conditions under which it is to be employed in the subsequent hydrogenation process. The effect of the sulfiding process is to purposely poison to a certain extent a catalyst which would otherwise be too active for the intended use. If it is desired to employ the catalyst in a hydrogenation reaction at comparatively low temperatures and pressures, the amount of the nickel which should be sulfided will be relatively low, perhaps about 3 to 6%. If, on the other hand, more drastic hydrogenation conditions are to be employed, such a higher temperatures or pressures or both, then the catalyst should be sulfided to the extent of about 8 to 10%, or higher. If the original catalyst contains a constituent such as alumina or chromium oxide, which is known to act as a promoter for the nickel, then it may be desirable to sulfide a greater portion of the nickel than would be required for a plain nickel catalyst to be used under similar circumstances. Excellent experimental results have been obtained by employing, under very active hydrogenation conditions, catalysts which have been sulfided to the extent of 50%. It will be readily apparent to those skilled in the art that the optimum degree of sulfiding will be regulated by a number of circumstanes including, besides those suggested above, the composition of the gas to be treated and the product which it is desired to obtain.

In the large scale use of these catalysts, a preferred procedure involves commencing the hydrogenation at a relatively low temperature and pressure and gradually increasing the severity of the hydrogenation conditions during the course of the run as the catalyst begins to lose its activity. The catalysts, however, have very little tendency to promote polymerization or tar formation from the unsaturated ingredients of the gases, and for this reason they lose their activity only very slowly. When the catalysts have become inefficient because of the amount of organic material which has collected on them, they may be regenerated in situ or after removal from the converter, either by an oxidation process such as that described in Example 9, or by treatment with hydrogen at reduction temperatures to crack the polymer, or by a steam treatment. The catalysts have been operated for periods of from 1 to 2 months before requiring regeneration. They may be regenerated a number of times, usually with no necessity for resulfiding. If necessary, however, for the proper control of the reaction, any of the catalysts may easily be resulfided or further sulfided at any time by a process analogous to the original sulfiding process described in Examples 1 or 2.

The catalysts of this invention have the outstanding advantage that they are highly resistant to poisoning by the usual catalyst poisons. Small concentrations of sulfur compounds, while they present a considerable problem in the employment of the majority of catalysts known heretofore, present no significant impediment to the satisfactory use of the catalysts of this invention. A number of substances, including benzene, toluene, cyclohexane, butadiene and complex mixtures of higher hydrocarbons resulting from cracking operations have been added prior to processing the gas mixtures described in the various examples without any adverse effects on catalyst activity or selectivity.

Excellent results have been obtained experimentally while varying between about 0 and 50% the water vapor content of the unsaturated gases passed over the catalyst. It should be noted, however, that in the case of gases which are apt to deposit polymer on the catalyst, this tendency may be counteracted by proper control of the water vapor content of the inlet gases. This tendency may also be overcome by operating at temperatures above about 175° C., regardless of the control of the water vapor concentration.

Any suitable apparatus may be used for carrying out the selective hydrogenation processes described in the above examples. Mild steel tubes have been found to be perfectly satisfactory, but these may be replaced by numerous other construction materials, such as glass, refractory materials, stainless steels and the like.

When the catalysts of the invention are employed for the selective hydrogenation of acetylene-containing gases, the acetylene is converted largely to ethylene and to some extent to ethane. This is apparently true even when the gas contains only a small amount of acetylene and a relatively large excess of hydrogen as in the gas compositions employed in Examples 6 and 7. Since the hydrogenation of the ethylene itself is slight, the result is that not only do these catalysts prevent excessive sacrifice of the original olefin content of a gas, but in many instances their use may result in an enrichment of the olefin content by reason of the ethylene derived via hydrogenation of acetylene.

Although the examples have been restricted, for the sake of clarity and conciseness, to the selective hydrogenation of acetylene by means of catalysts of this invention, nevertheless, it will be apparent to those skilled in the art that the catalysts may also be used for the selective hydrogenation of a number of other types of gas or liquid compositions containing several ingredients or groupings which differ as to their susceptibility to hydrogenation. The catalysts may be used to hydrogenate allylene or the butynes in the presence of the lower olefins, including propylene and the butylenes. They may also be used to hydrogenate vinyl-acetylene in the presence of butadiene, or phenyl acetylene in the presence of styrene. Under more active hydrogenation conditions, the catalysts may be employed to hydrogenate ethylenic linkages in the presence of aromatic structures, or to selectively hydrogenate a conjugated diolefin in the presence of the corresponding monoolefin. The field of usefulness of these catalysts is by no means limited to the hydrogenation of hydrocarbons but also includes other types of organic compounds containing unsaturation, such as acids, esters, aldehydes, ketones, nitriles, and the like. For instance, the catalysts may be used for selectively hydrogenating compounds containing in one molecule two types of unsaturation, one of which is represented by an acid, an ester, or a nitrile group and the other by carbon-to-carbon unsaturation. Interesting examples of such compounds include propiolic acid, dicyanobutene-2, and the esters of unsaturated acids such as methacrylic acid or ricinoleic acid. Because of their high sulfur tolerance, the catalysts may be particularly useful for the selective hydrogenation of unsaturated sulfur-containing organic compounds.

When hydrogenating an acetylene-containing gas the olefin content of the inlet gas may be varied at will within wide ranges. The difficult problem in this field is to find a catalyst which will reduce to very low levels the acetylene content of the gas without sacrificing large amounts of lower olefins, and once given a catalyst which is capable of reducing the acetylene content to 0.01%, as shown in the above examples, it is apparent that the same catalyst is also highly useful in hydrogenating a gas consisting substantially of acetylene in order to obtain therefrom a maximum yield of ethylene.

The principle of this invention is that by partially poisoning a hydrogenation catalyst and by controlling the extent of this poisoning, I have provided to the art an important new means for controlling selective hydrogenation reactions. Poisons other than sulfur may be used, including, for instance, phosphorus, arsenic, antimony, selenium, tellurium and the halogens. By employing partially poisoned catalysts in combination with known controls of hydrogenation reactions such as temperature, partial pressure of hydrogen and the like, many desirable results are obtainable which were not possible heretofore. For these reasons, it is not intended that the spirit and scope of this invention should be limited in any way other than by the claims appended hereto.

I claim:

1. A process for selectively hydrogenating acetylene present in small amounts in a gas comprising a lower olefin, acetylene and at least one mol of hydrogen per mol of acetylene which comprises passing said gas at a temperature within the range of 125° to 350° C. over a catalyst which has been prepared by a process which comprises treating a composition comprising nickel oxide with a hydrogen-containing reducing gas at a temperature of about 200° to 600° C. and thereafter treating the reduced composition with a sulfiding agent until the sulfur content of the resulting catalyst is from about 2 to about 50 equivalents of sulfur per 100 equivalents of nickel.

2. A process according to claim 1 in which the catalyst, after preparation, has been employed in a selective hydrogenation process and thereafter has been regenerated by treatment at about 500° C. with an oxidizing gas followed by treatment at 450° to 500° C. with a hydrogen-containing gas.

3. A process for selectively hydrogenating acetylene present in small amounts in a gas comprising a lower olefin, acetylene and at least one mol of hydrogen per mol of acetylene which comprises passing said gas at a temperature within the range of 125° to 350° C. over a catalyst which has been prepared by a process which comprises pelleting a composition containing as the essential catalytic constituents nickel oxide and an oxide of the group consisting of the oxides of aluminum, chromium and magnesium, sintering the pills at a temperature above 600° C., reducing the nickel oxide by treatment with a hydrogen-containing gas at 450° to 500° C. and thereafter sulfiding the pills by passing over them a gas containing hydrogen sulfide until the sulfur content of the resulting catalyst is from about 2 to about 50 equivalents of sulfur per 100 equivalents of nickel.

4. A process for selectively hydrogenating acetylene present in small amounts in a gas comprising a lower olefin, acetylene and at least one mol of hydrogen per mol of acetylene which comprises passing said gas at a temperature within the range of 125° to 350° C. over a catalyst which has been prepared by a process which comprises treating an active hydrogenation catalyst comprising reduced nickel oxide with a gas containing hydrogen sulfide until the catalyst has been sulfided to the extent of about 3–15%, said reduced nickel oxide having been obtained by treating a composition comprising nickel oxide with a hydrogen-containing reducing gas at a temperature of about 200° to 600° C.

5. A process for selectively hydrogenating acetylene present in small amounts in a gas comprising a lower olefin, acetylene and at least one mol of hydrogen per mol of acetylene which comprises passing said gas at a temperature within the range of 125° to 350° C. over a catalyst which has been prepared by a process which comprises precipitating nickel carbonate, igniting the precipitate to the oxide, forming the resulting composition into pills with the aid of a lubricant, sintering the pills at a temperature in excess of 600° C., treating the sintered pills with a hydrogen-containing gas at a temperature of 450° to 500° C. until substantially all of the nickel has been reduced, and treating the reduced nickel oxide pills with a hydrogen sulfide-containing gas until the sulfur content of the pills is from about 3 to about 15 equivalents of sulfur per 100 equivalents of nickel.

6. A process for selectively hydrogenating acetylene present in small amounts in a gas comprising a lower olefin, acetylene and at least one mol of hydrogen per mol of acetylene which comprises passing said gas at a temperature within the range of 125° to 350° C. over a catalyst containing nickel and aluminum in the ratio of about 75% NiO to 25% $Al_2O_3$, said catalyst having been prepared by a process which comprises adding alumina to a nickel nitrate solution, precipitating the nickel as nickel carbonate, igniting the precipitate of nickel carbonate and alumina to convert the nickel carbonate to nickel oxide, forming the resulting mixture into pills with the aid of a lubricant, sintering the pills at a temperature in excess of 600° C., treating the sintered pills with a hydrogen-containing gas at a temperature of 450° to 500° C. until substantially all of the nickel has been reduced, and treating the reduced pills with a hydrogen sulfide-containing gas until the sulfur content of the pills is from about 3 to about 15 atom equivalents of sulfur per 100 atom equivalents of nickel.

7. A process for selectively hydrogenating acetylene present in small amounts in a gas comprising a lower olefin, acetylene and at least one mol of hydrogen per mol of acetylene which comprises passing said gas at a temperature within the range of 125° to 350° C. over a catalyst containing nickel and chromium in the ratio of about 5% nickel to about 95% $Cr_2O_3$, said catalyst having been prepared by a process which comprises adding chromium oxide to a nickel nitrate solution, precipitating the nickel as nickel carbonate, igniting the precipitate of nickel carbonate and chromium oxide to convert the nickel carbonate to nickel oxide, forming the resulting mixture into pills with the aid of a lubricant, sintering the pills at a temperature in excess of 600° C., treating the sintered pills with a hydrogen-containing gas at a temperature of 450° to 500° C. until substantially all of the nickel has been reduced, and treating the reduced pills with a hydrogen sulfide-containing gas until the sulfur content of the pills is from about 3 to about 15 equivalents of sulfur per 100 equivalents of nickel.

8. A process for selectively hydrogenating acetylene present in small amounts in a gas comprising a lower olefin, acetylene and at least 1 mol of hydrogen per mol of acetylene which comprises passing said gas at a temperature within the range of 125° to 350° C. over a catalyst which has been prepared by a process which comprises treating a composition containing nickel oxide, alumina and magnesium oxide in the weight ratio of about 60:30:10 with a hydrogen-containing reducing gas at a temperature of about 200° to 600° C. and thereafter treating the reduced composition with a sulfiding agent until the sulfur content of the resulting catalyst is from about 2 to about 50 equivalents of sulfur per 100 equivalents of nickel.

9. A process for selectively hydrogenating acetylene present in small amounts in a gas comprising a lower olefin, acetylene, up to about 50% of water vapor based on the content of unsaturated gases, and at least 1 mol of hydrogen per mol of acetylene, which process comprises passing said gas at a temperature within the range of 125° to 350° C. over a catalyst which has been prepared by a process which comprises treating a composition containing nickel oxide with a hydrogen-containing reducing gas at a temperature of about 200° to 600° C. and thereafter treating the reduced composition with a sulfiding agent until the sulfur content of the resulting catalyst is from about 2 to about 50 equivalents of sulfur per 100 equivalents of nickel.

10. A process for selectively hydrogenating acetylene present in small amounts in a gas comprising a lower olefin, acetylene, about 2% of water vapor, and at least 1 mol of hydrogen per mol of acetylene, which process comprises passing said gas at a temperature within the range of 125° to 350° C. over a catalyst which has been prepared by a process which comprises treating a composition comprising nickel oxide with a hydrogen-containing reducing gas at a temperature of about 200° to 600° C. and thereafter treating the reduced composition with a sulfiding agent until the sulfur content of the resulting catalyst is from about 2 to about 50 equivalents of sulfur per 100 equivalents of nickel.

11. A process for selectively hydrogenating acetylene present in small amounts in a gas comprising a lower olefin, acetylene, substantially no sulfur compounds, and at least 1 mol hydrogen per mol acetylene, which process comprises passing said gas at a temperature within the range of 125° to 350° C. over a catalyst which has been prepared by a process which comprises treating a composition comprising nickel oxide with a hydrogen-containing reducing gas at a temperature of about 200° to 600° C. and thereafter treating the reduced composition with a sulfiding agent until the sulfur content of the resulting catalyst is from about 2 to about 50 equivalents of sulfur per 100 equivalents of nickel.

ARTHUR W. BARRY.

REFERENCES CITED

The following references are of record in the file of this patent:

UNITED STATES PATENTS

| Number | Name | Date |
|---|---|---|
| 1,156,068 | Ellis | Oct. 12, 1915 |
| 2,118,829 | Storch | May 31, 1938 |
| 2,359,759 | Hebbard | Oct. 10, 1944 |
| 2,379,670 | Welling et al. | July 3, 1945 |